(12) United States Patent
Jentzen

(10) Patent No.: US 6,217,269 B1
(45) Date of Patent: Apr. 17, 2001

(54) MECHANICAL LATCHING DEVICE

(76) Inventor: William Jentzen, 3000 Artesian Dr., Cedar Creek, TX (US) 78612

( * ) Notice: Subject to any disclaimer, the term of this patent is extended or adjusted under 35 U.S.C. 154(b) by 0 days.

(21) Appl. No.: 09/316,860

(22) Filed: May 21, 1999

(51) Int. Cl.[7] ............................. F16B 39/22; F16B 39/32
(52) U.S. Cl. ............................. 411/299; 411/296; 411/949
(58) Field of Search ............................. 411/10, 296, 299, 411/300, 316, 949, 950, 951

(56) References Cited

U.S. PATENT DOCUMENTS

| | | | |
|---|---|---|---|
| 1,881,749 | * 10/1932 | Llewellyn | 411/949 X |
| 2,730,154 | * 1/1956 | Aspey | 411/949 X |
| 2,869,881 | * 1/1959 | Smith | 411/949 X |
| 4,475,858 | * 10/1984 | Benjamin et al. | 411/299 X |
| 5,700,122 | * 12/1997 | Korpi | 411/299 X |

FOREIGN PATENT DOCUMENTS

2183769 * 6/1987 (GB) ............................. 411/10

* cited by examiner

*Primary Examiner*—Neill Wilson
(74) *Attorney, Agent, or Firm*—Winstead Sechrest & Minick P.C.

(57) ABSTRACT

A mechanism is disclosed which can be used to selectively establish the amount of resistance to un-screwing associated with common fittings, especially those with high pitch-angle threads. Such a mechanism is useful in a variety of applications, including tamper-evident mechanical assemblies, child-proof medicine bottles and fittings under substantial axial loads.

6 Claims, 10 Drawing Sheets

MECHANICAL LATCHING DEVICE

This application is related to U.S. application Ser. No. 09/305,243, filed May 4, 1999, now pending.

BACKGROUND OF THE INVENTION

(1) Field of the Invention

This invention is a mechanical locking device for threaded connectors.

(2) Description of the Problems and the Prior Art

A number of connections utilize threaded components, including nuts and bolts, threaded pipes and couplings, soda bottles and caps, and medical connectors. Such connections are simple to mate and can be attached and disconnected many times. This simplicity comes with two side effects which are undesirable in certain applications. First, the presence of angled threads creates the possibility of the connection self-loosening under axial loading—a term referred to as "backdriving". The greater the angle or "pitch" of the threads, the more likely that axial loading will cause backdriving. In some cases, users can add additional components such as lockwashers to prevent backdriving. In other cases, such additions are impractical or too expensive. Hence a need exists to provide backdriving resistance as an integral feature of the threaded connector. Secondly, very little torque is often required to disassemble the connections. This can be a problem when child-proofing is desired, or when one wants to discourage tampering with an assembly. The present invention may be used to overcome either of these shortcomings. An added advantage of the present invention is that it does not interfere with the ordinary function of threaded connections, and requires both mating sides to incorporate the described changes to operate. Components can be manufactured incorporating the feature, and only when assembled with a mating component also incorporating the feature would the user obtain the desired benefit. Hence a bolt with the features on the threads could still use a regular nut with no noticeable impact; a nut with the features on its threads could use a regular bolt with no noticeable impact; but a nut and bolt combined, with the mating features described herein, would demonstrate the desired characteristics.

SUMMARY OF THE INVENTION

The present invention provides features on both portions of a threaded connector to create an interference mechanism, leading to a "ratchet" effect. The extent of this interference can be determined by the designer to provide the degree of backdriving resistance desired for a given application. At modest levels of resistance the feature is not damaged by repeated assembly and disassembly. At high levels of resistance the features become permanently damaged and thereby may be used to indicate tampering.

The locations of these features can be selected so that they become engaged as assembly is started, only upon completion of assembly, or throughout the entire mating process. If the feature is engaged only at the start of assembly, one has, for instance, a nut which may be freely positioned anywhere along the length of a bolt, but resists having the nut fall all the way off the end of the bolt. If the feature is engaged only at the end of the assembly, it can be used to "lock" the nut in place, yet, once the strength of the "lock" is overcome, nut can be easily removed by hand. A bolt with the features along the length of the shaft would act like a ratchet, allowing the nut to be placed anywhere along its length and still require increased amounts of force to disassemble.

The amount of interference between the two components and the materials used in the interfering elements determines the amount of unscrewing resistance. It may range from being barely detectable, all the way through something which is nearly impossible to disassemble.

DESCRIPTION OF THE PREFERRED EMBODIMENTS

Figure 1:
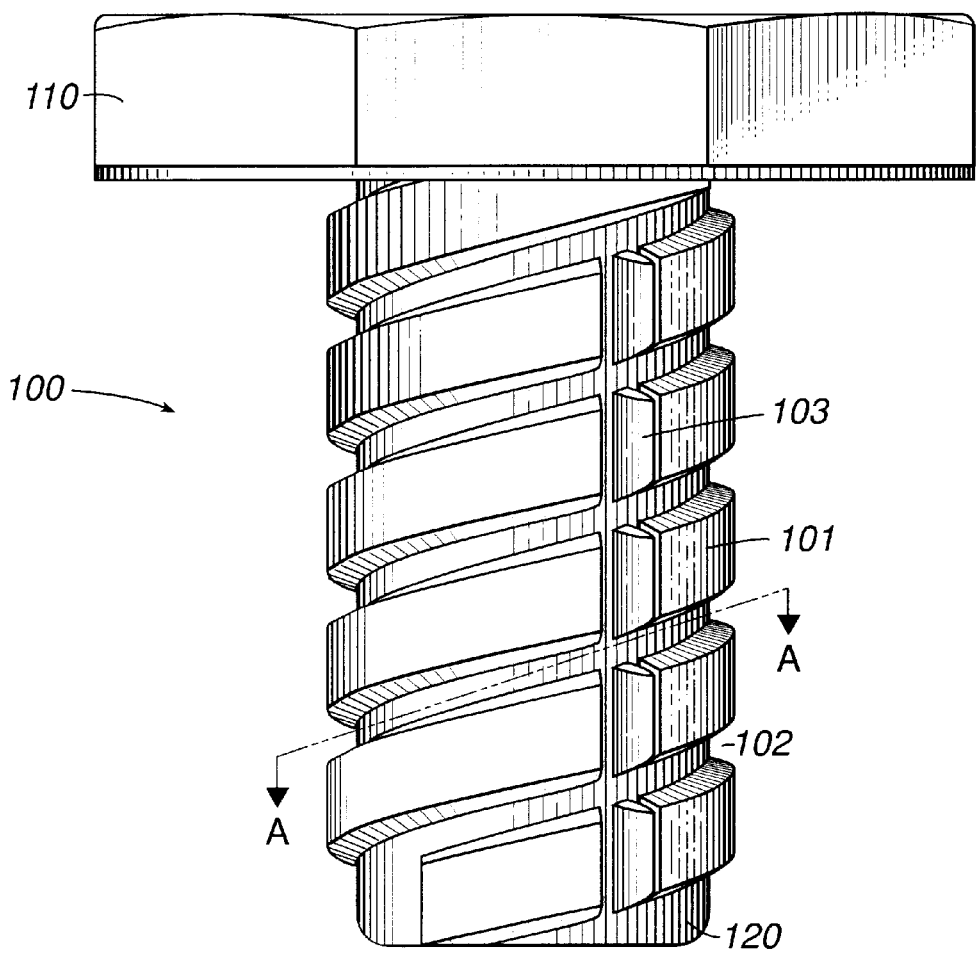
FIG. 1 is a view of the device of the present invention incorporated on a threaded bolt and nut.
Figure 1:
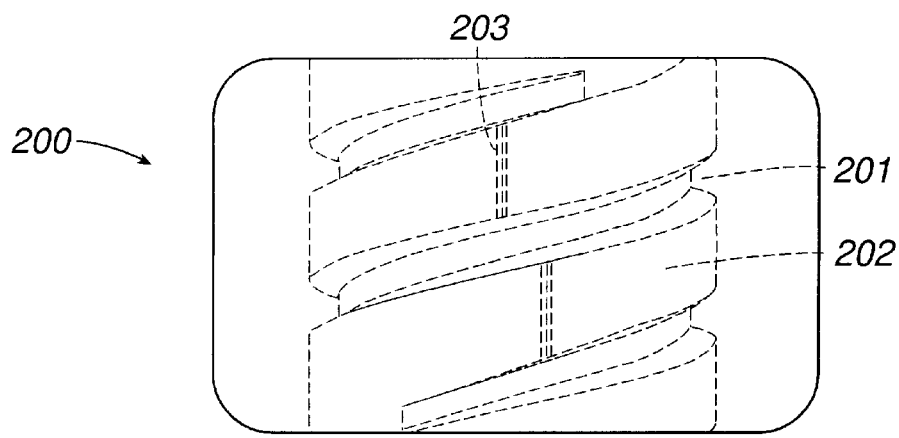

With first reference to FIG. 1, a preferred embodiment of the current invention is depicted using a male portion (in this case a bolt) 100, and a female portion (in this case a nut 200). These items may be made of any material, but for the sake of the current discussion assume the components are injection molded of some form of fairly rigid plastic—nylon being commonly used for such components. The bolt is depicted with a head 110 and a shaft 120. The threads may take any form, but the outer-most portion of the thread 101 is generally referred to as the "crest", while the inner-most portion 102 is generally referred to as the "root". In this embodiment, the thread is shown interrupted along the length of the shaft with a plurality of projections 103. For the sake of this discussion, the projections will be referred to as "fingers".

On a mating component 200 is shown threads compatible with those on component 100, with a crest 201 and a root 202. In this embodiment, interference with the fingers 103 will be provided by a plurality of ridges 203 located on the root segments.

While depicted as residing within the threads, it is important to note that the feature could just as easily have been incorporated in any area of the connection—say in an unthreaded extension to either the male 100 or female 200 portion of the connection.

Figure 2A:
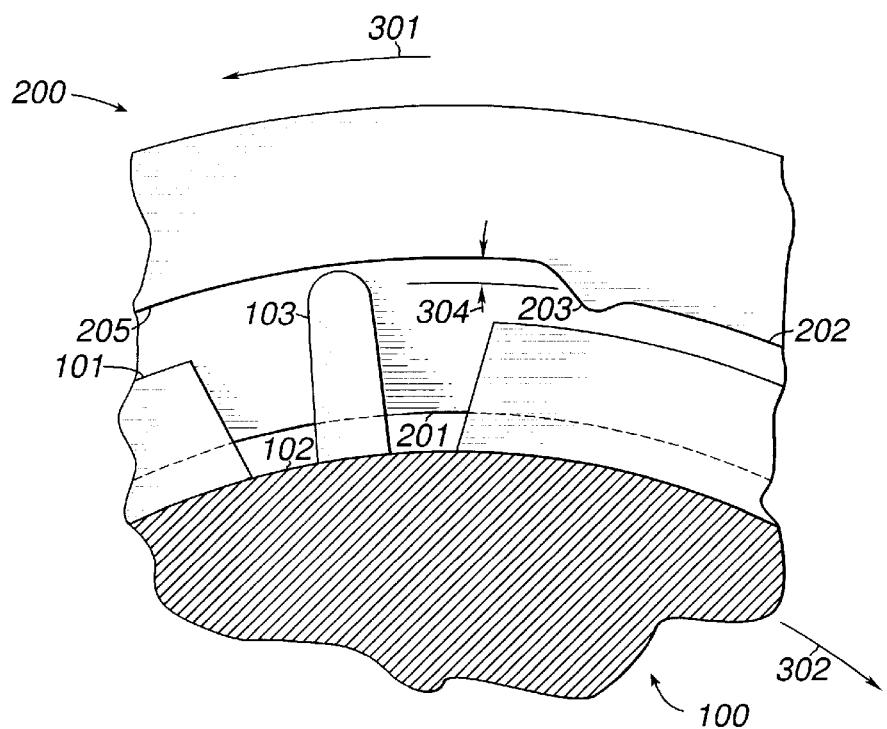
FIG. 2A is a partial, sectional view of the device in FIG. 1, taken along the line A—A. It shows a close up of the features prior to assembly.

Taking a partial sectional view along line A—A results in the depiction of the features in FIG. 2A. Female portion 200 has a projection 203 on the root of a thread segment 202. Male portion 100 has a finger 103 projecting from an interrupted portion of a thread whose crest is 101 and root is 102. Arrow 301 shows the direction of relative movement for the female component during assembly, while arrow 302 shows the direction of relative movement for the male component during assembly.

FIG. 2A depicts an important feature of the lead-in portion of the screw threads. Note that the normal thread root 202 of female portion 200 is closer to male portion 100 than the root in the lead-in area. The lead-in area root radius 205 is greater than root radius 202 by an amount 304. The function of this increased radius is to allow finger 103 to enter the thread form in its relaxed state, thereby having no impact on ease of initial assembly and preventing it from being inadvertently toggled forward during the process. Only when the threads are properly mated and threading begun will the projection 203 place the finger 103 into the correct orientation.

Figure 2B:
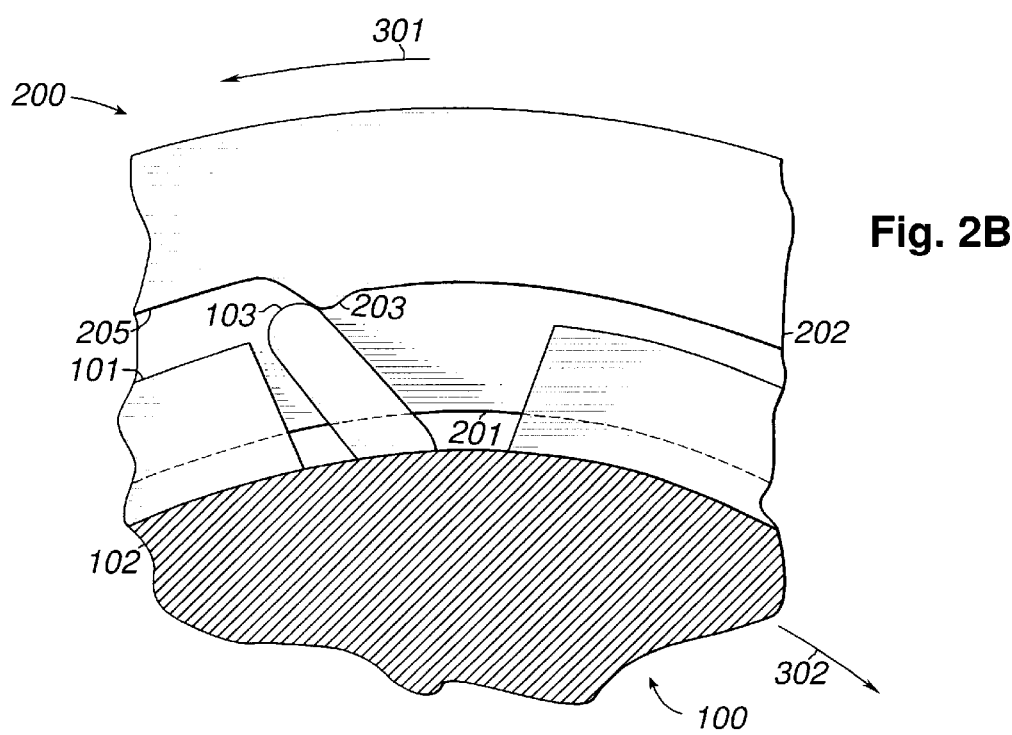
FIG. 2B is the same partial, sectional view of FIG. 2A except the connection is beginning to be tightened to bring the device of the present invention into operation.

FIG. 2B shows the interaction of the fingers 103 and the projection 203 during assembly. Since the finger 103 is made of a relatively flexible material, and made thin enough to be quite flexible, finger 103 readily deflects to allow assembly.

Figure 2C:
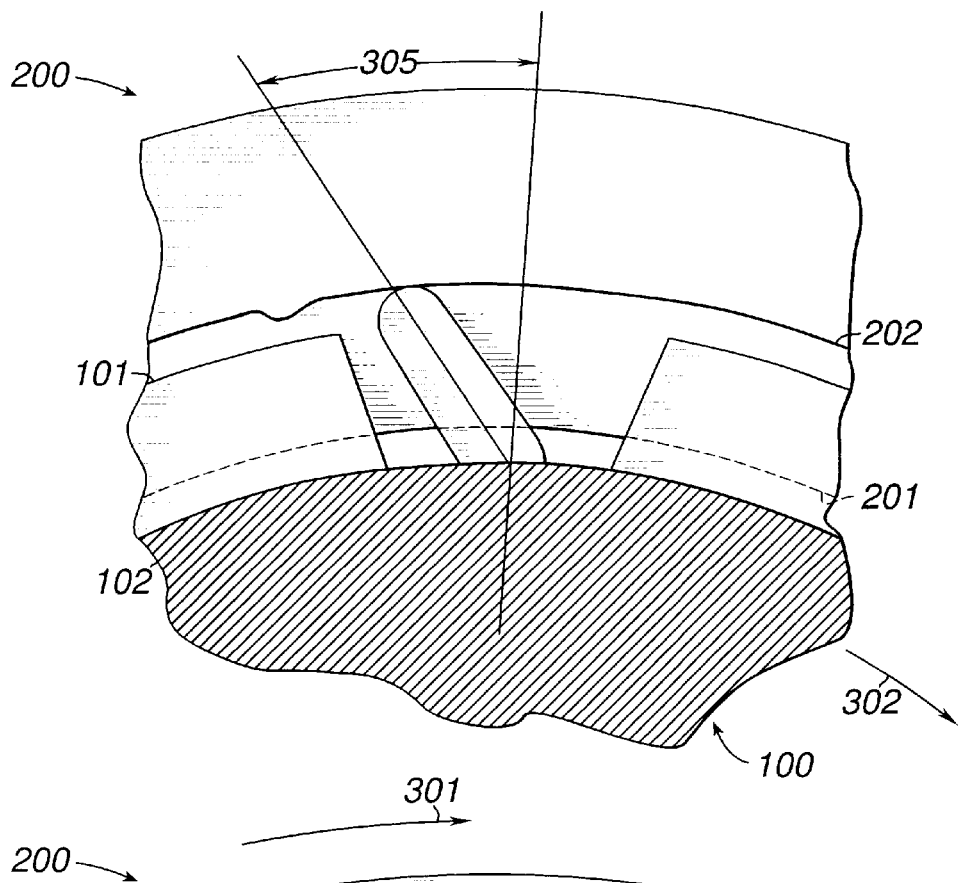
FIG. 2C is the same partial, sectional view of FIG. 2B except the connection is now tight and will resist unscrewing.

FIG. 2C continues the assembly process as the two components are rotated into a tight connection. The feature has little or no impact on assembly at this stage. This figure also depicts another variable available to the designer. Angle 305 is the angle between the finger 103 when in the assembled position and a line drawn from the center of male component 100 and a point at the center of the base of finger 103. This angle 305 determines a few critical operating parameters of the device. Too shallow an angle 305—say, less than 5 degrees—allows finger 103 to toggle over at projection 203 with little interference.

Too steep an angle 305, say 75 degrees—allows the finger 103 to continue deflecting and skip over the projection 203. Hence the device fails to function at too steep an angle. At the operative range of angles, steeper angles correspond to longer fingers 103, and thus increased distortion required of part 200, as will be described below. Because distortion of part 200 is a primary determinant of unscrewing force, steeper angles of finger 103 also correspond to increased unscrewing force.

Figure 2D:
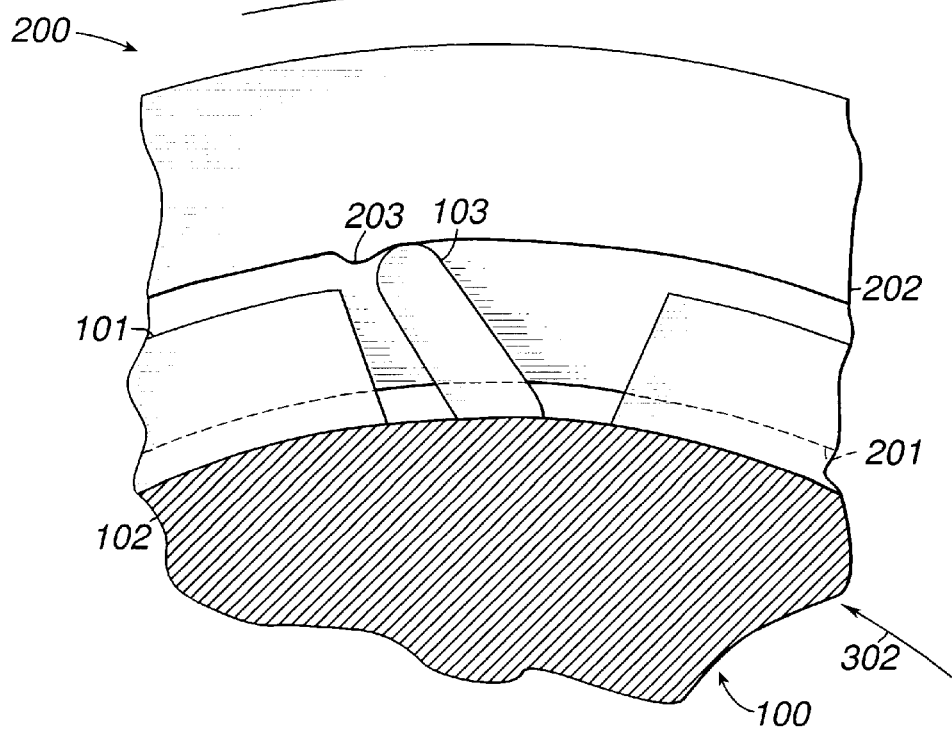
FIG. 2D is the same partial, sectional view of FIG. 2C except that the feature is shown resisting unscrewing forces.

FIG. 2D depicts what happens at the start of disassembly, as arrow 301 shows the direction of relative rotation of the female part and arrow 302 shows the direction of relative rotation of the male part. Finger 103 comes into contact with projection 203. The reverse angle of finger 103 imparted during assembly now becomes an impediment to disassembly, jamming against projection 203.

Figure 2E:
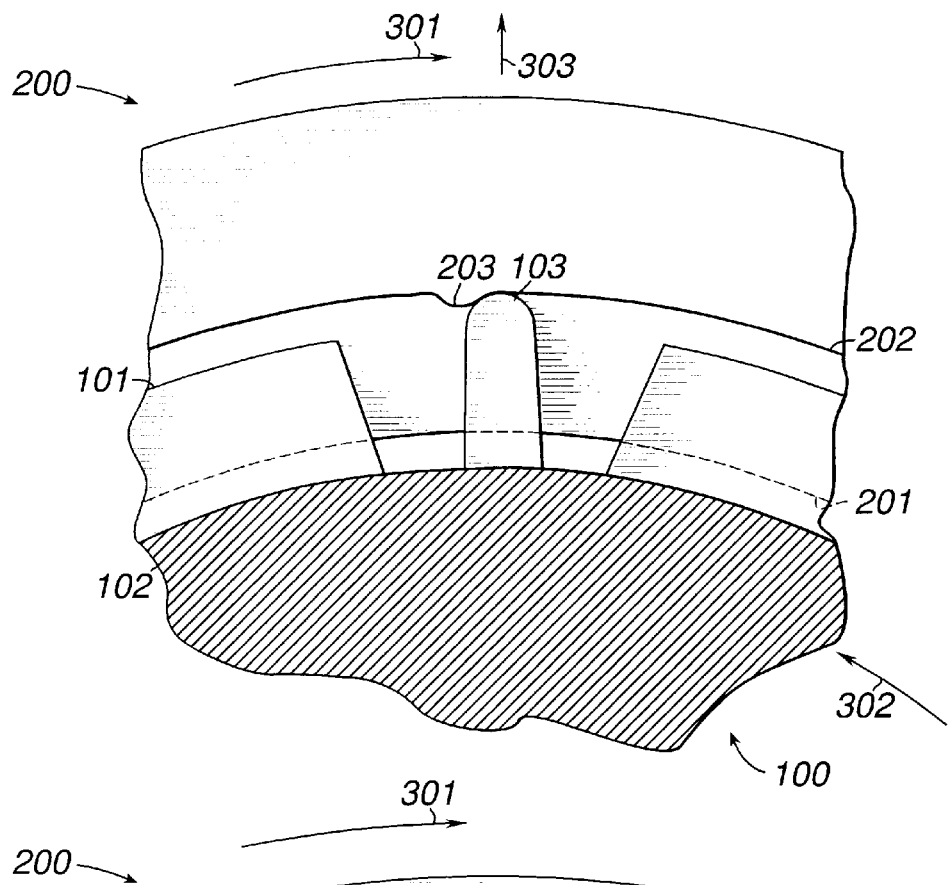
FIG. 2E is the same partial, sectional view of FIG. 2D except the strength of resistance is beginning to be overcome.

FIG. 2E depicts what happens in the presence of sufficient force to begin to overcome the feature. As rotational force is applied in the direction of arrows 301 and 302, the straightening of finger 103 forces female part 200 to deform outward in the direction of arrow 303. This allows finger 103 to begin to "toggle over".

Figure 2F:
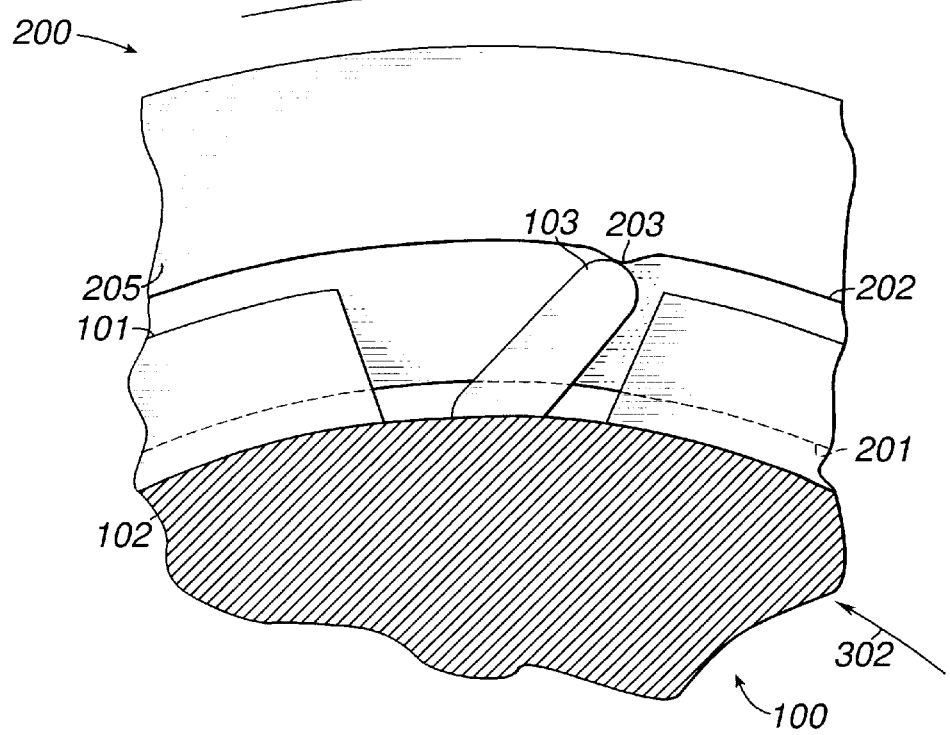
FIG. 2F is the same partial, sectional view of FIG. 2E except the feature of the present invention is continuing to be overcome.

FIG. 2F depicts the continued disassembly after overcoming the feature. Finger 103 now leans in a direction with will no longer prevent disassembly. Female component 200 may now recover to its original circular cross-section.

Figure 2G:
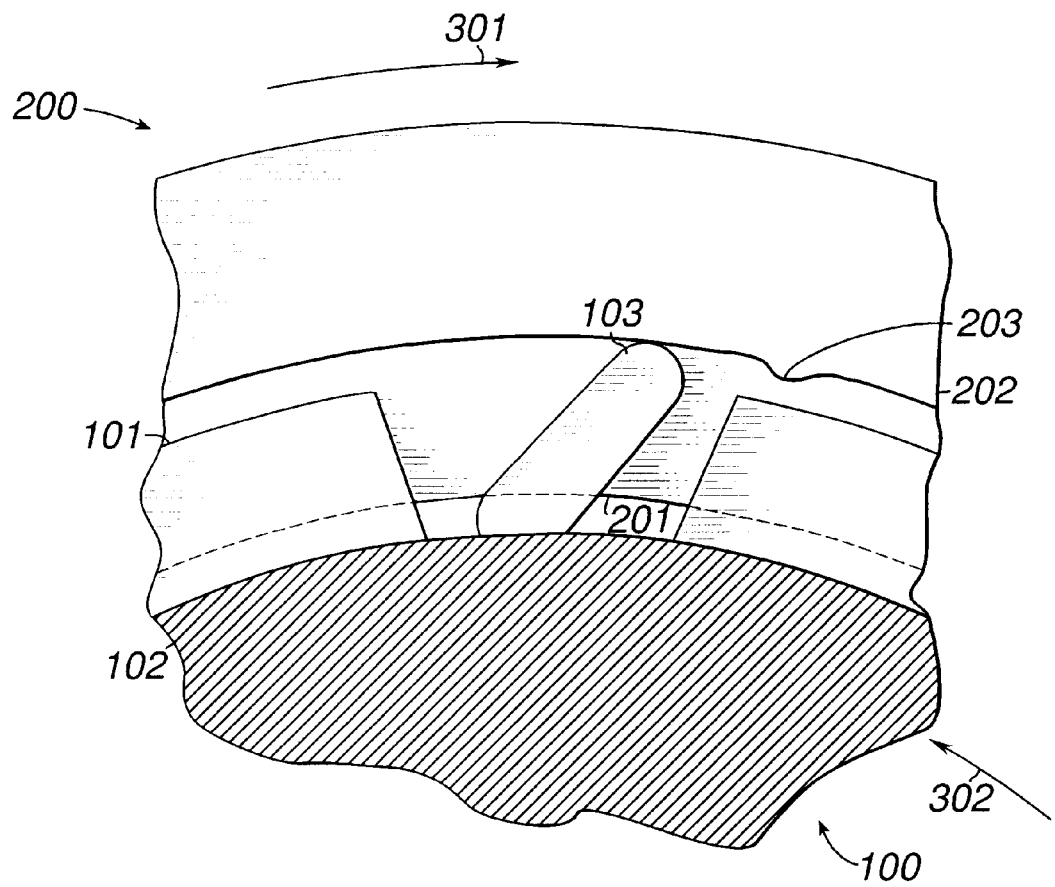
FIG. 2G is the same partial, sectional view of FIG. 2F except the feature of the present invention has been entirely overcome and no further resistance to disassembly will be created.

FIG. 2G depicts the feature after disassembly, with finger 103 no longer providing any material resistance to disassembly.

While depicted in a single material, two-component assembly, it is important to note that the feature can be incorporated using multiple materials in multiple components. Again with reference to FIG. 1, bolt 100 could be made of metal, and a slot could be machined into the side of the bolt. Fingers 103 could then be provided in the form of an inserted, flexible material such as plastic or spring steel.

Alternatively, if female component 200 is made of metal, it would likely resist the deformation required to allow non-destructive passage of fingers 103. Hence disassembly would likely require forces sufficient to shear fingers 103 off projection 120. In that case, if fingers 103 were thin and somewhat flexible, this might not require too much force—although the sheared remnants of fingers 103 would indicate that the connection had been disassembled. From such considerations as material, finger 103 sizing, engagement angle 305 and projection 203 sizing, the device of the present invention provides enormous flexibility to designers.

Figure 3:
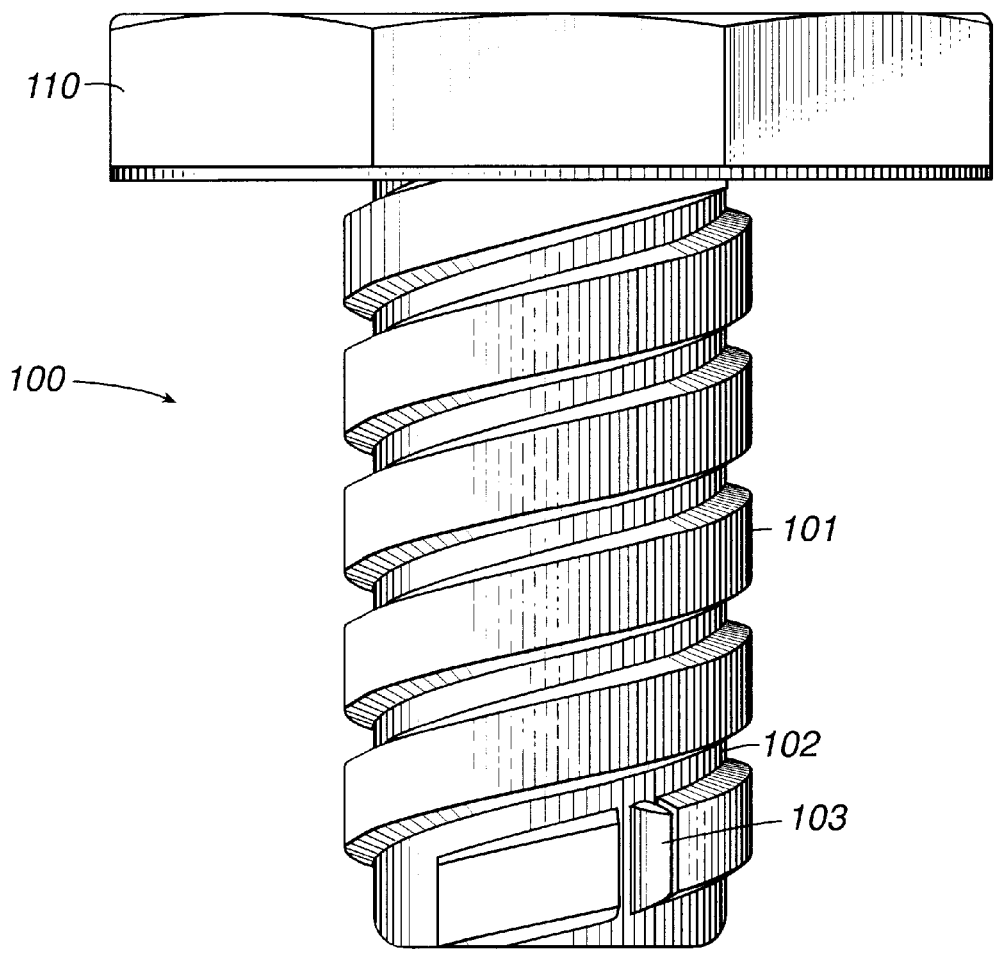
FIG. 3 is a view of an alternate preferred embodiment of the device of the present invention, showing the feature deployed merely as a stop to prevent the nut from being fully removed from the bolt.
Figure 3:
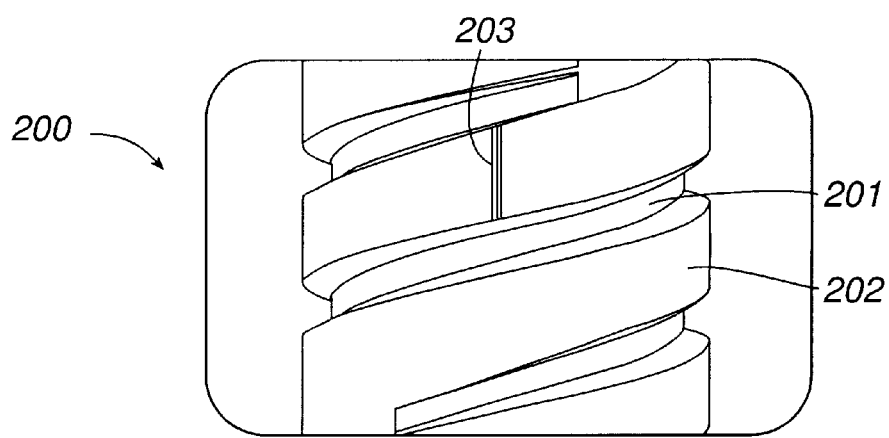

With reference to FIG. 3, the finger 103 is present only once, while projections 203 are present in plurality. In this embodiment, resistance to unscrewing is only present at the very end of the disassembly process. In this sense the feature provides a "nut retention" benefit—useful when complete disassembly and dropping the female component could be a problem (e.g. when a nut could fall into an engine or drop onto an operating electronic circuit board). Since it is possible that female component 200 may be threaded all the way down the shaft of male component 100—past the point where the finger 103 is engaged within female component 200—this embodiment requires some special consideration. Since finger 103 is "cocked" in the correct direction to resist disassembly as the projection 203 in the female component 200 passes it, it is important that finger 103 not re-straighten after it is completely out of the female component 200. Hence finger 103 must be made of some deformable material, rather than the elastic fingers 103 in other embodiments.

Figure 4:
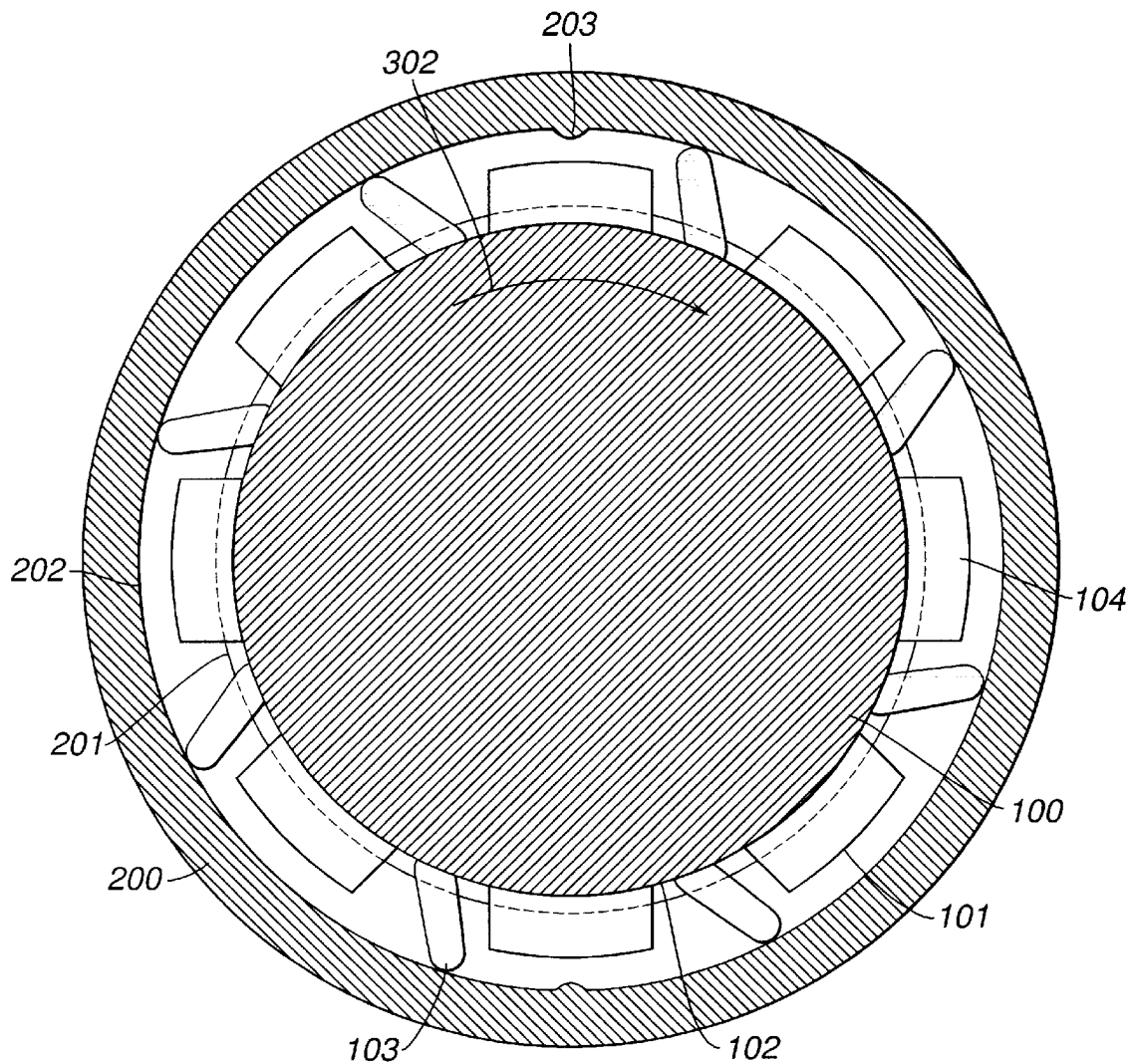
FIG. 4 is a sectional view of a device showing an alternate preferred embodiment of the device of the present invention. In this case, more than one set of interacting features is shown.

Now with reference to the cross-sectional alternate preferred embodiment in FIG. 4, a multitude of fingers 103 are depicted along interrupted thread segments 104 with crests 101 and roots 102 on male component 100. The female component 103 has two projections 203 emanating from the root section 202 of the threads. In the presence of rotational forces acting in the direction of arrow 302, fingers 103 pass easily over projections 203. In effect the fingers 103 "ratchet" over projections 203. Disassembly now requires substantial and continued application of rotational force in the opposite direction of arrow 302. Accordingly, the female component 200 could be readily placed anywhere along the threads of male part 100, yet require higher force levels to disassemble.

Interestingly, the choice of tool used to disassemble the connection has additional impact on the force required to complete the disassembly. If a rigid, metal cylinder (say a metal socket) is placed over female component 200, the metal cylinder would serve to reinforce the anti-rotation feature as it prevents part 200 from distorting to allow the finger 103 to pass. Conversely, if a segmented metal cylinder is used to grip female component 200, disassembly might still be achieved at relatively low levels of force.

Figure 5:
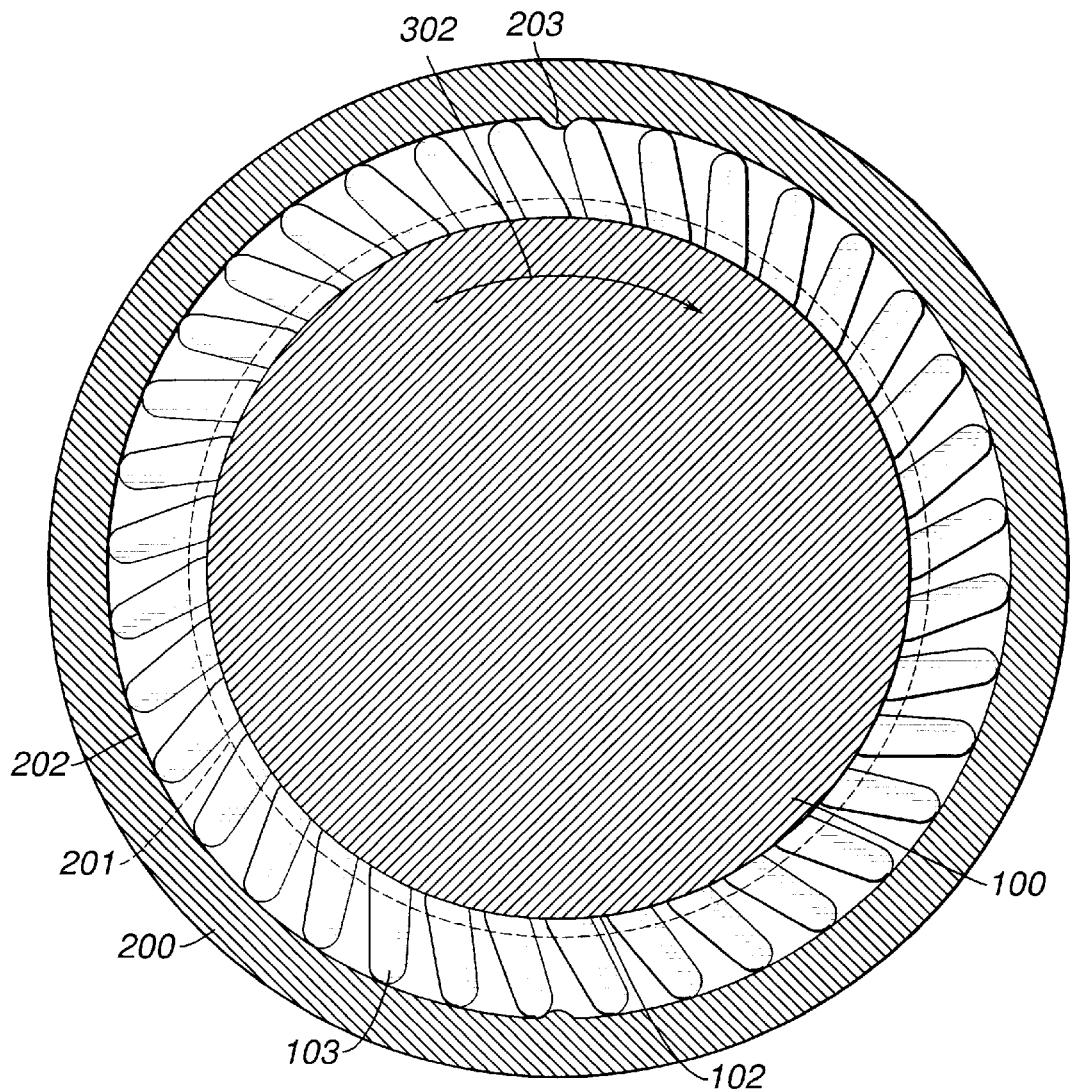
FIG. 5 is a sectional view of yet another preferred embodiment of the device of the present invention. In this case, the entire thread is replaced by locking features which now provide not only resistance to unscrewing but also all of the mechanical strength of the threads themselves.

Now with reference to the alternative preferred embodiment shown in cross-sectional view FIG. 5, one can see what happens as the proportion of fingers is increased to its maximum. There are no thread segments left on male part 100. The multitude of fingers 103 now provides the mechanical strength normally associated with the threads themselves.

Figure 6:
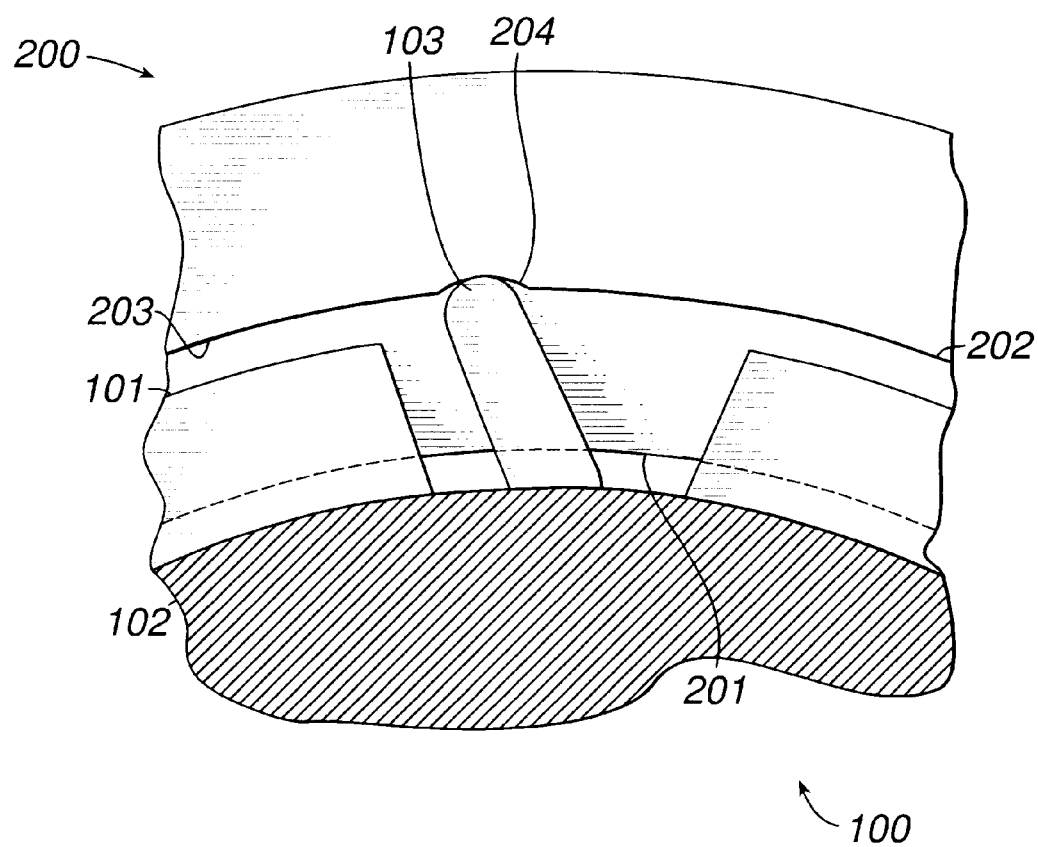
FIG. 6 is a partial sectional view of an alternate preferred embodiment of the device of the present invention. Rather than requiring projections on one side of the mating connection to interfere with a projection emanating from the other side, this view depicts the same result being achieved with a recess on one side of the connection.
Figure 7:
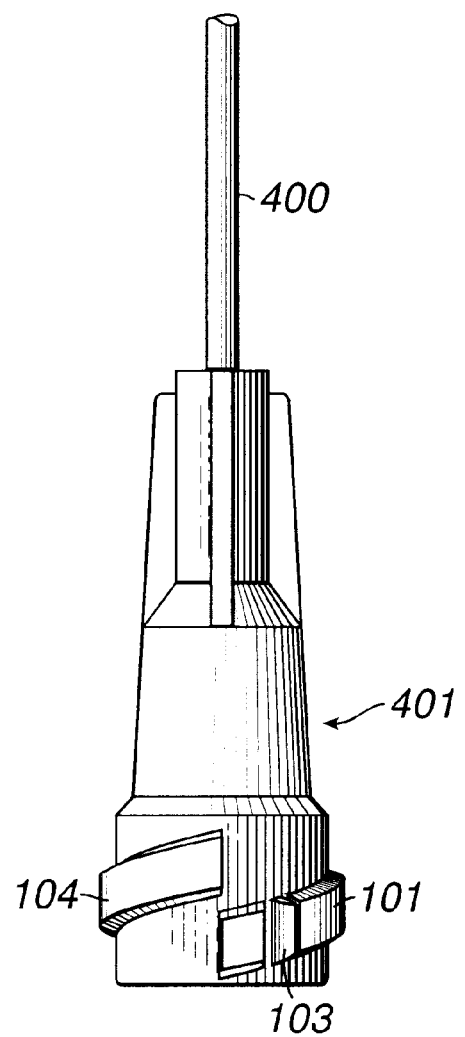
FIG. 7 illustrates an embodiment of the present invention utilized for attaching a syringe needle to a syringe chamber.
Figure 7:
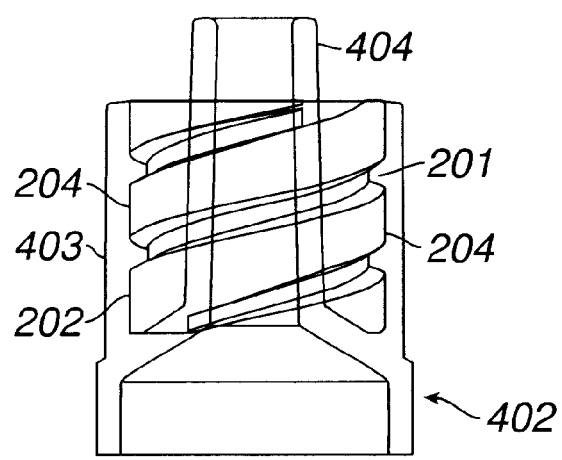

Finally, with reference to the alternative preferred embodiment shown in partial cross-sectional view of FIG. 6, the obstructions to passage of finger 103 is provided not by projections but by recess 204. This configuration may be easier to manufacture in metal, allowing standard threads to be cut and then a follow-on operation would create the recesses.

While all of the above embodiments depict the fingers on the male component and obstructions on the female, it may also be appreciated from FIG. 6 that there is no reason these two cannot be reversed and the same objectives achieved.

What is claimed and desired to be secured by Letters Patent is:

1. A mechanical latching device for a threaded connection, comprising:

a flexible projection from one side of the connection;

a rigid projection from another side of the connection;

the flexible and rigid projections positioned in such a way as to not impede a normal action of threads of the threaded connection;

the flexible and rigid projections positioned so that they must rotationally pass each other during assembly and disassembly of the threaded connection; and a distance between an inner radius of a female side of the connection and an outer radius of a male side of the connection at a lead-in side to the rigid projection is greater than a distance between an inner radius of the female side of the connection and an outer radius of the male side of the connection on an opposite side of the rigid projection from the lead-in side.

2. The mechanical latching device of claim 1, wherein the one side of the connection is the male side, and wherein the other side of the connection is the female side.

3. The mechanical latching device of claim 2, wherein the flexible projection is positioned within the thread of the male side of the threaded connection, and wherein the rigid projection is positioned within the thread of the female side of the threaded connection.

4. The mechanical latching device of claim 3, wherein the radius of a thread root on the female side of the threaded connection on the lead-in side of the rigid projection is greater than the radius of the thread root on the female side of the threaded connection on the opposite side of the rigid projection from the lead-in side.

5. The mechanical latching device of claim 4, wherein the flexible projection is positioned at a first angle relative to a normal to a surface of the male side of the threaded connection before engagement of the flexible projection and the rigid projection on the lead-in side, and wherein the flexible projection is positioned at a second angle relative to the normal to the surface of the male side of the threaded connection after engagement of the flexible projection and the rigid projection on the opposite side of the rigid projection from the lead-in side, wherein the second angle is greater than the first angle.

6. The mechanical latching device of claim 4, further comprising a plurality of the flexible projections positioned along a thread crown of the male side.

* * * * *